United States Patent [19]

Hunter

[11] 4,167,817
[45] Sep. 18, 1979

[54] ADAPTOR FOR MOUNTING WHEEL ALIGNMENT INSTRUMENTS ON VEHICULAR WHEELS

[76] Inventor: Lee Hunter, 13501 Ladue Rd., Ladue, Mo. 63141

[21] Appl. No.: 881,722

[22] Filed: Feb. 27, 1978

[51] Int. Cl.² ............... G01B 5/255; G01B 7/315; G01B 11/275
[52] U.S. Cl. .................... 33/288; 33/203.18; 33/299; 33/336; 356/155
[58] Field of Search ........ 33/180 AT, 203.18, 203.19, 33/203.20, 288, 299, 336; 248/225.3, 225.4; 356/155

[56] References Cited

U.S. PATENT DOCUMENTS

| | | | |
|---|---|---|---|
| 2,475,502 | 7/1949 | Holmes | 356/155 |
| 2,562,142 | 7/1951 | Frazee | 33/336 |
| 2,581,630 | 1/1952 | Carrigan | 33/336 |

FOREIGN PATENT DOCUMENTS

| | | | |
|---|---|---|---|
| 504926 | 8/1954 | Canada | 33/203.18 |
| 1219662 | 12/1959 | France | 33/288 |
| 1423373 | 2/1976 | United Kingdom | 356/155 |

Primary Examiner—Richard R. Stearns
Attorney, Agent, or Firm—Gravely, Lieder & Woodruff

[57] ABSTRACT

A adaptor for mounting a wheel alignment instrument on a wheel has a frame provided with a slideway and a slide assembly on the slideway of the frame. Both the frame and the slide assembly have gripping elements that are capable of bearing against and gripping axially directed surfaces on the wheel rim. Once the adaptor is positioned on the wheel rim with its gripping elements located along an axially directed surface, one of two actuating elements on the slide assembly is turned. The one actuating element causes the slide assembly to grip the slideway and then move outwardly so that the gripping elements firmly grip an inwardly presented surface, such as the inside face of a rim flange. The other actuating element causes the slide assembly to grip the slideway and then move inwardly so that the gripping elements firmly grip an outwardly presented surface, such as the outside face of a rim flange.

6 Claims, 6 Drawing Figures

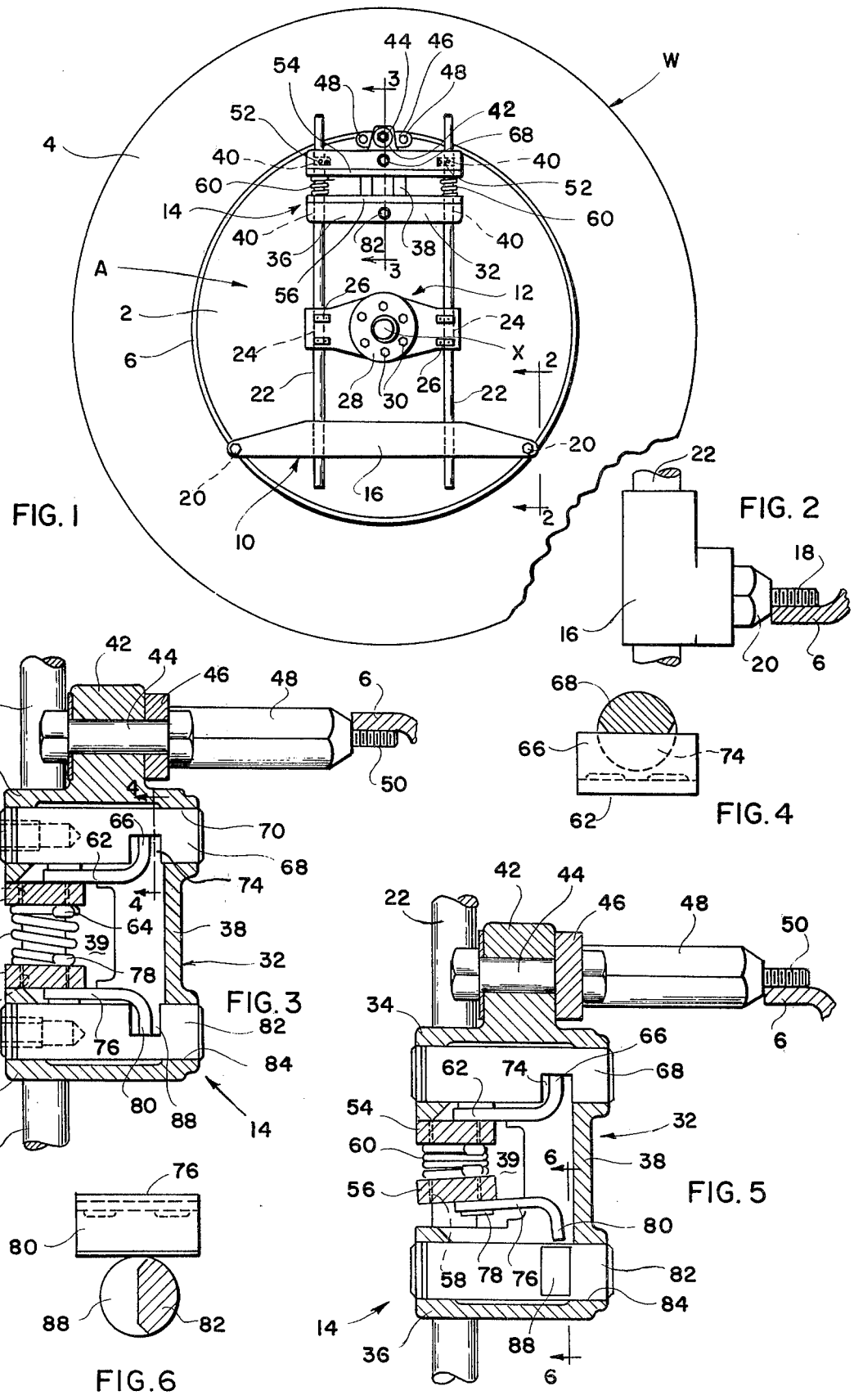

ADAPTOR FOR MOUNTING WHEEL ALIGNMENT INSTRUMENTS ON VEHICULAR WHEELS

BACKGROUND OF THE INVENTION

This invention relates in general to automotive vehicles service and maintenance equipment therefor, and more particularly, to an adaptor for mounting wheel alignment instruments or other devices on the wheels of automotive vehicles.

A variety of equipment is currently marketed for ascertaining and adjusting the alignment of wheels on automotive vehicles, particularly the front wheels by which such vehicles are steered. This equipment includes instrumentation which must be mounted on the wheels themselves and to this end various wheel adaptors have been developed.

Perhaps the simplest and most common wheel adaptor grips the axially directed flange along the periphery of a stamped metal wheel rim at three locations so as to provide a three-point mounting. The actual gripping elements of these adaptors are nothing more than threaded studs made from a hardened steel. The studs lie along the rim flange, and the crests of the threads bite into the softer metal of the flange to firmly secure the adaptor in place. These adaptors possess the capability of urging the threaded studs outwardly away from the center of the wheel so that they bite into the inside face of the rim flange or urging the studs inwardly so that they will bite into the outside face of the rim flange. The reversibility is needed for some wheels have the inside face of the rim flange obscured, while others have the outside face obscured. Also, some wheels are castings of aluminum or magnesium, and most wheels of this type can only be gripped along their outside surfaces. Despite their convertibility, such adaptors are not easily transformed from an inside gripping capability to an outside gripping capability or vice-versa. Usually the adaptor must be disassembled to convert from one capability to the other. An adapter of this nature is disclosed in U.S. Pat. No. 2,475,502, issued July 5, 1949.

SUMMARY OF THE INVENTION

One of the principal objects of the present invention is to provide a wheel adapter for mounting alignment instruments, with the adaptor having the capability of engaging the wheel rim by pressing against either an inwardly presented or an outwardly presented surface along the wheel rim. Another object is to provide a wheel adapter of the type stated which may be used for either gripping the inwardly presented or outwardly presented surface on a wheel rim without disassembly of the adaptor. A further object is to provide an adaptor of the type stated which is easily and quickly installed. An additional object is to provide an adaptor of the type stated which is ideally suited for gripping the axially directed flange of a wheel rim made from stamped metal. These and other objects and advantages will become apparent hereinafter.

The present invention is embodied in an apparatus including a frame having a slideway, at least one rim gripping element on the frame, a slide block on the slideway of the frame, another rim gripping element on the slide block, means for exerting a spreading force between the slide block and frame so as to urge the gripping elements apart, and means for exerting a contracting force between the slide block and frame for urging the gripping elements together. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

FIG. 1 is a front elevational view of the adaptor of the present invention installed on a wheel with the gripping elements of the adaptor bearing against the inside face of the peripheral flange on the wheel rim;

FIG. 2 is a sectional view taken along line 2—2 of FIG. 1 and showing a typical rim gripping element of the frame;

FIG. 3 is a sectional view taken along line 3—3 of FIG. 1 and showing both locking plates and their respective actuating pins in their release positions;

FIG. 4 is a sectional view taken along line 4—4 of FIG. 3 and showing the lip of the operating lever for the upper lock plate in the slot of the upper actuating pin;

FIG. 5 is a sectional view similar to FIG. 3, but showing the lower actuating pin rotated out of the release position so as to cock the lower lock plate and depress the slide block, thus enabling the gripping elements to bite into the outer surface of the rim flange; and FIG. 6 is a sectional view taken along line 6—6 of FIG. 5 and showing the lip of the lower operating lever bearing against the cylindrical surface of the lower actuating pin.

DETAILED DESCRIPTION

Referring now to the drawings (FIG. 1), A designates an adaptor for attaching alignment instruments (not shown) to a wheel W of an automotive vehicle for ascertaining the various alignment characteristics of the wheel W, such as caster, camber, toe-in, set-back, centerline steering and rear wheel track. The wheel W is conventional and includes a rim 2 on which a pneumatic tire 4 is mounted. The rim 2 may be formed as a metal stamping, and when so formed has the typical lip or flange 6 at its periphery. This flange 6 is substantially concentric with the axis X of rotation for the wheel W, and its outwardly presented edge defines a plane that is parallel to the plane of rotation for the wheel W and therefore perpendicular to the axis X. On some wheels the tire 4 obscures the outside surface of the flange 6, and this renders the flange 6 more accessible from its inside surface. On other wheels, components of the rim 2 or hub interfere with the inside surface, in which case the outside surface is usually more accessible. The adaptor A grips the wheel at the rim flange 6, either by expanding against the inside surface of the flange 6 or contracting against the outside surface. While the adapter A is particularly suited for use with stamped rims 2, it is also suited for use with cast rims, inasmuch as such rims invariably have either an inwardly presented or outwardly presented marginal surface which may be gripped by the adaptor A.

The adaptor A (FIG. 1) basically includes a frame 10 which at one end is capable of engaging the rim flange 6 of the wheel W at two locations thereon, an instrument mount 12 that is mounted on the frame 10 and is configured to couple with an alignment instrument (not shown), and a slide assembly 14 that is located at the opposite end of the frame 10 and is also capable of engaging the rim flange 6 at a different location. The slide 14 moves relative to the frame 10, thereby enabling the adaptor A to accommodate wheels W of varying diameter.

Considering first the frame 10, it has a cross bar 16 provided at each end with a threaded stud 18 (FIG. 2) that projects rearwardly from bar 16. The studs 18 are parallel and serve to locate the frame 10 on the rim flange 6 of the wheel W. Actually, each stud 18 projects axially from a rim button 20 which in turn is threaded into the cross bar 16. The rim button 20 has a planar abutment surface surrounding the threaded stud 18, and that surface is perpendicular to the axis of the stud 18 and wide enough to bear against the edge of the rim flange 6 when the threaded stud 18 is along either the inside face or the outside face of the rim flange 6. The two studs 18 at the ends of the cross bar 16 constitute two points of a three point mounting for the adaptor A.

In addition to the rim buttons 20 and the threaded studs 18, the frame 10 also has a pair of parallel slide rods 22 (FIG. 1) which are anchored in the cross bar 14 on each side of its midpoint and are oriented perpendicular to a plane defined by the parallel axes of the two studs 18. Moreover, the slide rods 22 are spaced equidistantly from the studs 18 at the ends of the cross bar 16.

The instrument mount 12 (FIG. 1) spans the space between the two slide rods 22 and at its ends is provided with parallel bores 24 through which the rods 22 pass. The fit between the rods 22 and the mount 12 at the bores 24 is loose enough to enable the mount 12 to slide along the rods 22. The mount 12 has spring loaded friction shoes 26 for maintaining it in any desired position along the rods 22. The portion of the mount 12 located between the two rods 22 is enlarged and provided with a seating surface 28 against which an alignment instrument may be positioned. The seating surface 28 supports connectors 30 which are used to couple the alignment instrument to the mount 12. The connectors 30 are manually operated and easily accessible.

The slide assembly 14 is also mounted on the slide rods 22 (FIG. 1), but is beyond the instrument mount 12, and it includes a slide block 32 that bridges the space between the two slide rods 22 and has upper and lower sections 34 and 36, respectively. The sections 34 and 36 are joined together by an intervening connecting section 38 which is offset somewhat rearwardly from sections 34 and 36 so that a continuous cavity 39 (FIG. 2) exists between the two sections 34 and 36. That cavity opens forwardly, that is, away from the threaded studs 18. The three sections 34, 36 and 38 are all united, preferably in a single casting. Each section 34 and 36 at its ends has bores 40 (FIG. 1) which receive the rods 22 so that the slide assembly 14 may be moved to adjusted positions farther from or closer to the cross bar 16.

The upper section 34 further has a boss 42 (FIGS. 1 and 3) which is centered between the two bores 40 and projects outwardly away from the upper section 34 and the instrument mount 12. The boss 42 is fitted with a pivot pin 44 on which a rocker arm 46 is mounted, with the axis of the pin 44 being perpendicular to the plane defined by the axes of the two slide rods 22 and located precisely midway between the two rods 22. The rocker arm 46 projects laterally in both directions from the boss 42 and is permitted a limited amount of rotation or rocking motion on the boss 42. At each end, the rocker arm 46 is fitted with an elongated rim button 48 that extends rearwardly therefrom and at its remote end is provided with a threaded stud 50 that is harder than the rim 2. The axis of each stud 50 is coincident with the axis of its button 48, and those axes are parallel to the axes of the other threaded studs 18 located on the cross bar 16. Like the rim buttons 20, each rim button 48 has an abutment face at its remote end from which its stud 50 projects and that face is a perpendicular to the axis of the stud 50 and wide enough to abut against the edge of the rim flange 6 when the stud 50 is in operative position either against the inside face or the outside face of the rim flange 6.

Thus, the abutment faces at the ends of the elongated rim buttons 48 serve to locate the slide assembly 14 in the axial direction with respect to the rim 2. Moreover, the abutment faces of the buttons 48 and the abutment faces of the buttons 20 are spaced equidistantly from the plane defined by the axes of the two slide rods 22. Hence, when the adaptor A is installed on the wheel W with the abutment faces of its four rim buttons 20 and 48 against the edge of the rim flange 6, the plane defined by the axes of the two slide rods 22 will be parallel to the plane of rotation for the wheel W and perpendicular to the axis X of rotation.

At each bore 40 in the upper section 34 of the slide block 32, the upper section 34 is fitted with a spring loaded friction shoe 52 (FIG. 1) which holds the slide assembly 14 in any desired location to which it has been moved on the slide rods 22.

Extended along the lower surface of the upper slide section 34 is an upper lock plate 54 (FIGS. 1 and 3) and likewise extended along the upper surface of the lower slide section 36 is a lower lock plate 56. Each lock plate 54 and 56 at its ends has circular apertures 58 (FIG. 3) through which the slide rods 22 extend so that the plates 54 and 56 are confined in the cavity 39 between the two slide sections 34 and 36 by the slide rods 22. The two lock plates 54 and 56 are urged apart by compression-type coil springs 60 which encircle the slide rods 22 in the cavity 39 and at their ends bear against the opposed surfaces of the lock plates 54 and 56 so as to maintain the lock plates 54 and 56 generally parallel with their center planes perpendicular to the axes of the rods 22.

Midway between its ends the upper lock plate 54 has an operating lever 62 (FIG. 3) attached firmly to it, such as by rivets 64, and this lever projects rearwardly into the connecting section 38 of the slide block 32 where it turns outwardly in the provision of a lip 66. The lip 66 at its free end bears against a rotatable actuating pin 68 that fits through a bore 70 located in the upper slide section 34 midway between the two bores 40 through which the rods 22 pass, with the common axis of the pin 68 and the bore 70 being perpendicular to the plane defined by the axes of the two slide rods 22. At its forward end, the actuating pin 68 has a socket 72 for enabling the pin 68 to be engaged and turned by a wrench (not shown). The socket 72 may be hexagonal in configuration. In addition the actuating pin 68 has a transverse slot 74 which aligns with the lip 66 of the operating lever 62 and opens radially outwardly. In one position of rotation for the pin 68 (FIGS. 3 and 4) the lip 66 is received in the slot 74 and the upper lock plate 54 assumes a generally horizontal disposition, that is, a position in which its center plane is generally perpendicular to the axes of the two rods 22. When the plate 54 is so disposed it slides freely over the slide rods 22. This is the release position for the actuating pin 68 and lock plate 54. However, when the pin 68 is rotated in either direction out of its release position, it forces the lip 66 downwardly and thereby causes the upper lock plate 54 to tilt or rotate about its forward margin that is against the upper section 34 of the slide block 32 and thereby assume a cocked condition. As a consequence, the upper lock plate 54 binds against rods 22. Once the lock plate 54 binds, further rotation of the actuating pin 68 displaces the entire slide block 32, or in other words, moves the slide block 32 away from the cross bar 16 on the frame 10. In effect, the entire adaptor A expands. Once the actuating pin 68 reaches about 90° from its release position, the lip 66 rides up onto the cylindrical surface of the pin 68. Usually the slide block 32 does not move for the full duration of the rotation for the pin 68, since the upper lock plate 54 is slightly flexible to accommodate rotation of the pin 68 beyond the point at which movement of the block 32 ceases.

The lower lock plate 56 likewise has an operating lever 76 (FIG. 3) attached to it by rivets 78, and this lever, while extending forwardly toward the connecting Section 38 as does the lever 62, has its lip 80 turned inwardly toward the cross bar 16 instead of outwardly. The free end of the lip 80 bears against a lower actuating pin 82 that revolves in a bore 84 within the lower section 36 of the slide block 32. The pin 82 contains a forwardly opening socket 86 that is configured to receive the same wrench used for rotating the upper actuating pin 68. The lower actuating pin 82 also has a transverse slot 88 that aligns with the lip 80 on the lower operating lever 78. When the actuating pin 82 is in its release position, that is when the lip 80 of the lever 76 is in the slot 88, the lower lock plate 56 is likewise in its release position, that is, the position in which its center plane is perpendicular to the axes of the two slide rods 22. However, when the lower pin 82 is rotated, the plate 56 assumes a cocked position wherein it binds against the slide rods 22 at the edges of its circular aperture 58 (FIG. 5). Then continued rotation of the lower actuating pin 82 forces the entire slide block 32 toward the cross bar 16 of the frame 10. This moves the threaded studs 50 of the slide 14 toward the threaded studs 18 on the cross bar 16, or in other words, contracts the adaptor A. The lip 80 eventually rides up onto the cylindrical surface of the lever pin 82. The lower lock plate 56 is slightly flexible to accommodate the additional rotation of the lever pin 82.

Operation

The adaptor A mounts on wheel rims 2 of varying diameter, either by gripping the inside or outside surfaces of the flanges 6 on the rims 2. The adaptor A thereby serves to mount a wheel alignment instrument in a predetermined position with respect to the wheel W. Before installing the adaptor A, the operator must inspect the rim 2 to determine which surface of its flange 6 is most accessible, that is, which surface will be most easily gripped by the threaded studs 18 and 50 on the cross bar 16 and the slide 14, respectively. In some cases, such as with cast rims, no axial flange 6 exists, but most rims, irrespective of whether they are stamped or cast, usually have an exposed surface that faces either inwardly or outwardly. While the operation of the adaptor A will be discussed in terms of gripping the axial flange 6 on a stamped rim 6, it should be understood that a surface on a cast or other rim may be gripped just as easily.

If the inside surface of the rim flange 6 appears to provide the best surface for gripping the rim 2, the operator moves the slide assembly 14 on the slide bar 22 until the threaded studs are located in a position which will enable them to fit within the interior of the rim flange 6. In this regard, the two actuating pins 68 and 82 and their respective lock plates 54 and 56 are normally in their release positions (FIG. 3), in which case the slide assembly 14 is free to move upwardly and downwardly on the slide rods 22. The friction shoes 52, however, hold the slide assembly 14 in any position to which it is moved. Once the slide assembly 14 is moved far enough inwardly to enable all four threaded studs 18 and 50 to fit within the rim flange 6, the adapter A is positioned within the rim 2 and the slide assembly 14 is then moved outwardly until all four threaded studs 18 and 50 bear against the inside surface of the rim flange 6 (FIGS. 1-3). This provides a temporary three-point mounting inasmuch as the two threaded studs 50 on the slide assembly 14 are connected to the slide frame 32 at a single pivot point, namely, the pivot pin 44. At this time care is exercised to insure that the abutment faces at the remote ends of the rim buttons 20 and 48 abut against the outside edge of the rim flange 6.

After the adaptor A is temporarily positioned in the foregoing manner, an actuating wrench is inserted into the socket 72 of the upper actuating pin 68, and that pin is turned away from its release position. As the pin 68 revolves, the lip on the upper operating lever 62 is forced downwardly out of the slot 74 in the pin 68, and this causes the entire upper lock plate 54 to pivot and assume a cocked position with respect to the slide rods 22. This causes the lock plate 54 to bind against the rods 22. Continued rotation of the actuating pin 68 urges the slide block 32 away from the cross bar 16, thus causing the two sets of threaded studs 18 and 50 to bear tightly against the inside surface of the rim flange 6. The threads on the studs 18 and 50 tend to bite into the softer metal of the rim flange 6 so that the adapter A securely grips the rim 2 along the rim flange 6. The actuating pin 68 is rotated until its lip 66 moves completely out of the slot 74 and rides upon the cylindrical surface of the pin 68. This requires at least 90° of rotation. Preferably, the actuating pin 68 is rotated 180°. Since the threaded studs 18 and 50 bite into the rim flange 6 well before the lip 66 on the actuating lever 62 reaches the cylindrical surface of the lever pin 68, the upper plate 54 may flex slightly intermediate its circular apertures 58 and acquire a bowed configuration to accommodate the rotation of the pin 68 beyond the point at which the movement of the block 32 ceases.

Once the adaptor A is emplaced in the foregoing manner, the instrument mount 12 is moved along the slide rods 22 until it is centered with respect to the axis X of rotation for the wheel W. Then an aligning instrument is attached to the mount 12 in the usual manner.

If the outside surface of the flange 6 on the wheel rim 2 appears more accessible, the slide assembly 14 with both of its actuating pins 68 and 82 in their release positions is moved outwardly until the two sets of threaded studs 18 and 50 are far enough apart to fit over the outside surface of the flange 6. The adaptor A is temporarily positioned on the wheel W by bringing the studs 18 and 50 over the outside surface of the rim flange 6 and then moving the slide assembly 14 toward the cross bar 16 until all four studs 18 and 50 engage the outside surface of the flange 6. Again, care is exercised to insure that the abutment faces on the rim buttons 20 and 48 bear against the outside edge of the rim flange 6. Next, the wrench is inserted into the lower actuating pin 82 and turned. This urges the lip 80 on the operating lever 76 out of the slot 88 in the pin 82, and the lower lock plate 56, as a consequence, cocks and binds against the slide rods 22 (FIGS. 5 and 6). Further rotation of the lever pin 82 serves to urge the slide 14 toward the cross bar 16, or in other words, contract the adaptor A. This causes the threaded studs 18 and 50 to bite into softer metal of the rim flange 6. Any movement of the slide assembly 14 beyond the point at which the studs 18 and 50 bear tightly against the outside surface of the flange 6 is accommodated by a slight bowing of the lower lock plate 56.

Once the adaptor A is emplaced in its contracted position, the instrument mount 12 is adjusted to the proper location and a suitable instrument is attached to it.

While the rocker arm 46 is provided with two pins, it is understood that a single pin may be employed, in which case it will be installed in the position occupied by the pivot pin 44.

This invention is intended to cover all changes and modifications of the example of the invention herein chosen for purposes of the disclosure which do not constitute departures from the spirit and scope of the invention.

What is claimed is:

1. In an apparatus for attaching instruments to wheel rims and including a cross bar, spaced apart first gripping elements mounted on the cross bar and being capable of bearing against and gripping an inwardly or an outwardly presented marginal surface of a wheel rim, two spaced apart slide rods extended from the cross bar in between the first gripping elements with the slide rods being parallel to each other, an improved slide assembly positioned along the slide rod and being capable of gripping a wheel rim along either an outwardly or an inwardly presented marginal surface of the rim without removing the slide assembly from the slide rods, said slide assembly comprising: a slide block having an upper section, a lower section spaced from the upper section, and a connecting section joining the upper and lower sections together, the upper and lower sections having spaced apart bores which receive the slide rods such that the slide block is capable of moving along the rods toward and away from the cross bar; upper and lower lock plates in the space between the upper and lower sections of the slide block with the upper lock plate being adjacent to the upper section and the lower lock plate being adjacent to the lower section, each lock plate having apertures which loosely receive the slide rods to enable the plate to rock between a release position in which it allows the slide block to move and a cocked position in which the plate binds against the rods and prevents movement of the slide block; an operating lever on each lock plate and projecting laterally therefrom intermediate the apertures in the plate; compression springs located between the two lock plates such that each spring engages on both of the lock plates to urge the upper lock plate to its release position adjacent to the upper section of the slide block and the lower lock plate to its release position adjacent to the lower section of the slide block; an upper actuating pin in the upper section of the slide block and having a camming surface thereon which bears against the operating lever of the first lock plate, the camming surface being configured to move the upper lock plate from its release position to its cocked position when the upper pin is turned and to further urge the slide block away from the cross bar once the upper lock plate binds against the slide rods in its cocked position; a lower actuating pin in the lower section of the slide block and having a camming surface thereon which bears against the operating lever of the lower lock plate, the camming surface of the lower actuating pin being configured to move the lower plate from its release position to its cocked position when the lower pin is turned and to further urge the slide block toward the cross bar once the lower lock plate binds against the slide rods in its cocked position, said upper and lower actuating pins each including means for detachably receiving an operator whereby said pins are selectively operable by said operator such that said slide block is selectively movable along said slide rods for effectively gripping an inwardly or an outwardly presented marginal surface of a wheel rim; and at least one second gripping element carried by the slide block and being capable of bearing against and gripping an inwardly or an outwardly presented marginal surface on a wheel rim, whereby rotation of the upper actuating pin will enable the first and second gripping elements to bear tightly against the grip an inwardly presented marginal surface on the wheel rim, while rotation of the lower actuating element will enable the gripping element to bear tightly against and grip an outwardly presented marginal surface on the wheel rim.

2. The structure according to claim 1 wherein each lever includes a lip which extends in the direction of the slide rods, with the lip of the one lever being turned away from the cross bar and the lip on the other lever being turned toward the cross bar; and wherein the camming surfaces on the actuating pins bear against the lips of the levers.

3. The structure according to claim 1 wherein the actuating pins have cross slots in which lips provided on the lever means are received when the locking plates do not grip the slide rods; and wherein the bottoms of the slots serve as the camming surfaces for displacing the lips relative to their respective block sections when the actuating pins rotate.

4. The structure according to claim 1 and further comprising an abutment surface carried by the slide block; and wherein the second gripping element projects from the abutment surface such that the abutment surface is both above and below the gripping element, whereby the abutment surface will abut against the edge of a wheel rim irrespective of whether the gripping element engages an outwardly or an inwardly presented marginal surface on the rim.

5. The structure according to claim 1 and further comprising a rocker arm carried by the slide block and being capable of pivoting with respect to the block about an axis that is substantially perpendicular to the plane defined by the axes of the two slide rods; and wherein two second gripping elements are on the rocker arm with one being on one side of the pivot axis for the arm and the other being on the other side of that axis.

6. The structure according to claim 5 and further comprising abutment surfaces on the rocker arm on each side of the pivot axis for the rocker arm, with each surface being in a plane generally perpendicular to the pivot axis of the arm; and wherein the second gripping elements project perpendicularly from the abutment surfaces such that the surfaces are both above and below the gripping elements, whereby the abutment surfaces will abut against the wheel rim irrespective of whether the gripping elements engage an outwardly or an inwardly presented marginal surface on the rim.

* * * * *

UNITED STATES PATENT AND TRADEMARK OFFICE
CERTIFICATE OF CORRECTION

PATENT NO. : 4,167,817

DATED : September 18, 1979

INVENTOR(S) : Lee Hunter

It is certified that error appears in the above-identified patent and that said Letters Patent are hereby corrected as shown below:

(in Abstract), line 1, before "adaptor" delete "A" and substitute therefore -- "An"

Column 8, line 20, after "against" and before "grip" delete "the" and substitute therefor -- "and"

Signed and Sealed this

Fourth Day of December 1979

[SEAL]

Attest:

SIDNEY A. DIAMOND

Attesting Officer

Commissioner of Patents and Trademarks